No. 751,462. PATENTED FEB. 9, 1904.
J. N. CLAPHAM.
REIN HOLDER.
APPLICATION FILED MAR. 30, 1903.
NO MODEL.
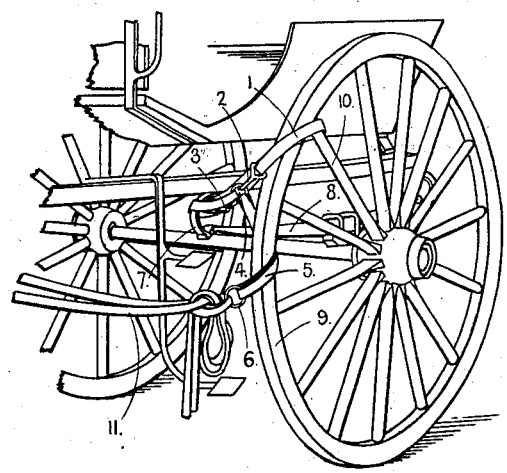
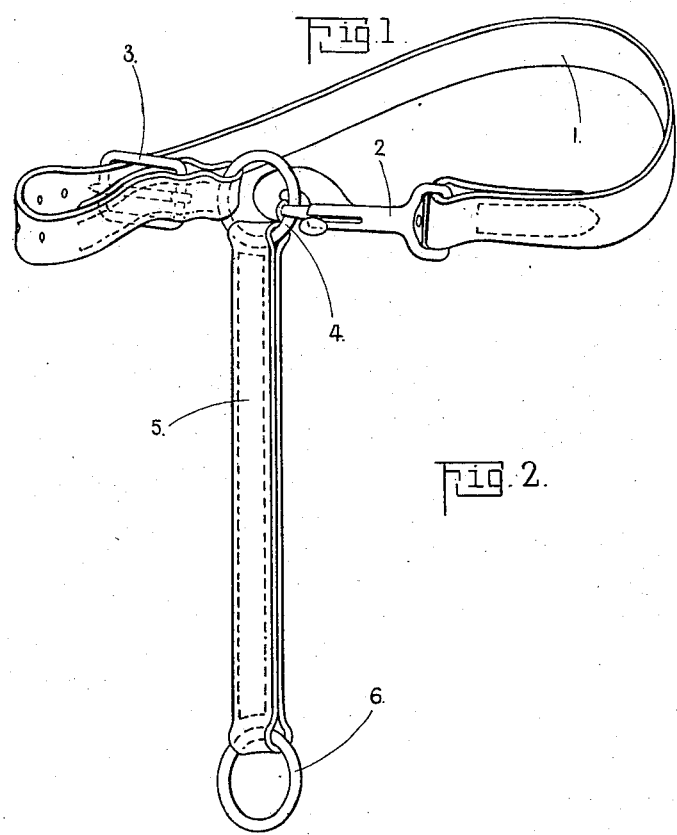

No. 751,462. Patented February 9, 1904.

UNITED STATES PATENT OFFICE.

JOHN NEWSOME CLAPHAM, OF ASHHURST, NEW ZEALAND, ASSIGNOR OF ONE-HALF TO GEORGE SPENCER CLAPHAM, OF ASHHURST, NEW ZEALAND.

REIN-HOLDER.

SPECIFICATION forming part of Letters Patent No. 751,462, dated February 9, 1904.

Application filed March 30, 1903. Serial No. 150,087. (No model.)

*To all whom it may concern:*

Be it known that I, JOHN NEWSOME CLAPHAM, a subject of His Majesty the King of Great Britain and Ireland, residing at Ashhurst, in the Colony of New Zealand, have invented new and useful Improvements in Devices for Preventing Horses from Running Away with Vehicles when Unattended, of which the following is a specification.

In the case of a horse attempting to start away with a vehicle to which this invention has been applied the reins are drawn tight or the wheel locked and the horse thus effectually prevented from running away.

Describing the invention by the aid of the accompanying drawings, Figure 1 is a perspective view of the device attached to a vehicle, and Fig. 2 a similar view of the same removed from a vehicle.

1 is a strap, to one end of which a spring-hook 2 is firmly attached. A ring 4 is securely attached to the other end, and a buckle 3 is fixed to the strap above the ring 4. Another strap 5 is attached at one end to the ring 4 and at the other end is provided with a ring 6.

To adjust the device upon a vehicle, the strap 1 is unbuckled and the hook 2 passed around the shaft of the vehicle or, as shown on the drawings, around the scroll-iron 7 of the spring 8, or it may be passed around any other convenient part of the vehicle. The spring-hook is then passed through the buckle and the strap buckled, as shown in Fig. 2. The device is thus securely buckled upon the scroll-iron. The spring-hook is then passed around the felly 9 or a spoke 10 of the wheel and afterward fastened upon the ring 4. The strap 1 thus adjusted will lock the wheel to prevent the horse from going backward with the vehicle. The ring 6 and strap 5 are passed around the felly 9 in front of the spoke in advance of the spoke behind which the strap 1 is passed, and the reins 11 are drawn through the ring 6, but leaving sufficient slackness to prevent irksomeness to the animal. The reins are then secured to the ring by tying. When the two straps are thus adjusted and the horse attempts to advance, the revolution of the wheel causes the spoke to exert a pull upon the strap 5 and the reins 11, and the horse is thus effectually stopped. If the horse should attempt to go backward, the strap 1 will lock the wheel before a pull is put upon the reins 11.

What I claim as my invention, and desire to secure by Letters Patent, is—

For the purpose indicated in combination a strap, a spring-hook upon one end thereof, and a buckle upon the opposite end, a ring through which the end of the strap having the buckle is threaded, and a strap secured to said ring and having another ring at its outer end substantially as specified and illustrated.

In witness whereof I have hereunto set my hand in the presence of two witnesses.

JOHN NEWSOME CLAPHAM.

Witnesses:
T. S. WESTON,
CLAUDE H. WESTON.